US012015202B2

(12) United States Patent
Bhattacharyya et al.

(10) Patent No.: US 12,015,202 B2
(45) Date of Patent: Jun. 18, 2024

(54) MULTISEGMENT REFLECTOR ANTENNA DIRECTING BEAMS

(71) Applicant: LOCKHEED MARTIN CORPORATION, Bethesda, MD (US)

(72) Inventors: Arun Kumar Bhattacharyya, Littleton, CO (US); Elie Germain Tianang, Aurora, CO (US); Alan Cherrette, Highlands Ranch, CO (US); Jonathan James Bennett, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/195,901

(22) Filed: May 10, 2023

(65) Prior Publication Data

US 2023/0282987 A1 Sep. 7, 2023

Related U.S. Application Data

(62) Division of application No. 16/989,795, filed on Aug. 10, 2020, now Pat. No. 11,688,950.

(51) Int. Cl.

| | |
|---|---|
| ***H01Q 19/19*** | (2006.01) |
| ***H01Q 3/14*** | (2006.01) |
| ***H01Q 3/26*** | (2006.01) |
| ***H01Q 5/35*** | (2015.01) |
| ***H01Q 15/16*** | (2006.01) |
| ***H01Q 15/18*** | (2006.01) |

(52) U.S. Cl.
CPC ............. *H01Q 15/162* (2013.01); *H01Q 3/14* (2013.01); *H01Q 3/2658* (2013.01); *H01Q 5/35* (2015.01); *H01Q 15/18* (2013.01)

(58) Field of Classification Search
CPC ........ H01Q 15/162; H01Q 15/18; H01Q 3/14; H01Q 3/2658; H01Q 5/35; H01Q 19/193
See application file for complete search history.

(56) References Cited

U.S. PATENT DOCUMENTS

| | | | | |
|---|---|---|---|---|
| 3,797,020 | A * | 3/1974 | Roger | H01Q 15/22 343/837 |
| 3,852,763 | A * | 12/1974 | Kreutel, Jr. | H01Q 19/12 343/DIG. 2 |
| 6,172,649 | B1 * | 1/2001 | Lenormand | H01Q 25/007 343/781 CA |
| 7,450,079 | B1 | 11/2008 | Baldauf | |
| 9,270,013 | B2 * | 2/2016 | Ley | H01Q 19/19 |
| 9,531,081 | B2 * | 12/2016 | Huber | H01Q 3/2658 |
| 9,935,375 | B2 | 4/2018 | Bowers | |
| 2014/0152492 | A1 | 6/2014 | Zimmerman | |
| 2016/0372835 | A1 * | 12/2016 | Toso | H01Q 15/16 |
| 2019/0190146 | A1 | 6/2019 | Hand | |

FOREIGN PATENT DOCUMENTS

| | | | | |
|---|---|---|---|---|
| EP | 1020952 | A1 * | 7/2000 | H01Q 1/288 |
| KR | 10-2191808 | | 12/2020 | |

* cited by examiner

*Primary Examiner* — Awat M Salih
(74) *Attorney, Agent, or Firm* — BAKERHOSTETLER

(57) ABSTRACT

A multisegment array-fed reflector antenna includes a feed array consisting of a number of subarrays and a multisegment reflector to reflect multiple beams of the feed array into a number of elevation angles. A support structure couples the multisegment reflector to the feed array. The multisegment reflector includes two or more ring-focus parabolic segments, and each ring-focus parabolic segment is a parabolic surface extending along a circle around the support structure.

20 Claims, 7 Drawing Sheets

700B

700C

700A

MULTISEGMENT REFLECTOR ANTENNA DIRECTING BEAMS

CROSS-REFERENCE TO RELATED APPLICATIONS

This application is a divisional of U.S. patent application Ser. No. 16/989,795, entitled "MULTISEGMENT ARRAY-FED RING-FOCUS REFLECTOR ANTENNA FOR WIDE-ANGLE SCANNING," filed Aug. 10, 2020, of which is hereby incorporated herein in its entirety.

STATEMENT REGARDING FEDERALLY SPONSORED RESEARCH OR DEVELOPMENT

Not applicable.

FIELD OF THE INVENTION

The present invention generally relates to communication systems and, more particularly, to a multisegment array-fed ring-focus reflector antenna for wide-angle scanning.

BACKGROUND

With the advent of smaller and lower-cost spacecraft (e.g., microsatellites and nanosatellites) and the ability to launch these small spacecraft into low Earth orbit (LEO) more cheaply by ridesharing on a launch vehicle, more LEO satellite applications (e.g., remote sensing) are becoming economically viable. As a consequence, the number of LEO satellites in orbit is greatly increasing. Due to the small size and low power capabilities of these satellites, the downlink equivalent, isotropically radiated power (EIRP) of these LEO satellites is limited (e.g., 3 dBW to 18 dBW). Closing communications links to these low-EIRP LEO spacecraft requires relatively large gimbaled-reflector antennas (e.g., 3.7 m to 7.2 m aperture diameters) on the ground. Since a space-ground link requires one reflector antenna on the ground per LEO spacecraft in view, there will be a need to increase the number of reflector antennas on the ground in proportion to the number of LEO satellites in orbit to get the data from these satellites back to Earth.

Currently, many LEO satellite operators have been installing their own ground gateway networks that consist of a set of reflector antennas and the associated network connections that allow their data to be routed to data centers for processing and storage (cloud services). This is not an efficient use of ground resources, because any given reflector antenna is not used 100% of the time by a single satellite operator. In order to provide more efficient use of terrestrial reflector antennas, commercial-gateway services are now becoming available that lease time on these reflector antennas. A satellite operator in this case can lease time on a commercial network of terrestrial reflector antennas and avoid the capital expense and upkeep expense of an underutilized operator-owned ground gateway network. The problem with reflector antennas for this application is that one space-ground link requires one reflector antenna on the ground per LEO spacecraft in view. Therefore, large numbers of big reflector antennas (e.g., 3.7 m to 7.2 m aperture diameters) are needed to service the growing number of LEO spacecraft.

Big reflector antennas require a lot of land to scan to low-elevation angles (e.g., 5 degrees). For example, placing ten 3.7 m reflector antennas in a plane such that each reflector antenna can scan to 5 degrees elevation in any azimuth direction requires ten acres of land (or one acre per 3.7 m reflector antenna). Larger reflector antennas require more area per antenna. The placement area goes up as the square of the antenna diameter. The requirement for a large amount of land to support multiple reflector antennas means reflector antennas are usually located far away from data centers where the downlinked satellite data is processed and stored. To connect the reflector antennas to the data center requires fiber backhaul and the associated recurring expense.

SUMMARY

According to various aspects of the subject technology, methods and configurations are disclosed for providing a multibeam antenna that can be located on a data center and perform the function of multiple reflector antennas without the associated acreage and backhaul costs.

In one or more aspects, a multisegment array-fed reflector antenna includes a feed array consisting of a number of subarrays and a multisegment reflector to reflect multiple beams of the feed array into a number of elevation angles. A support structure couples the multisegment reflector to the feed array. The multisegment reflector includes one or more ring-focus parabolic segments, and each ring-focus parabolic segment is a parabolic surface of rotation extending around a circle centered about the support structure.

In other aspects, a multisegment reflector antenna includes a feed array consisting of multiple subarrays disposed over a support structure and a multisegment reflector disposed around the support structure to reflect several beams of the feed array into a number of elevation angles. The multisegment reflector includes one or more ring-focus parabolic segments. Each ring-focus parabolic segment is a parabolic surface of rotation extending around a circle centered about the support structure.

In yet other aspects, a dual-reflector multisegment antenna includes a first reflector including a reflecting concave surface and an electronically scanned array (ESA)-feed panel coupled to a base of the first reflector. The antenna further includes a second reflector facing the ESA-feed panel and at a distance from the ESA-feed panel. The second reflector is a parabolic reflector and directs a several beams radiated by the ESA-feed panel to the reflecting concave surface of the first reflector. The first reflector is a conical reflector, and the reflecting concave surface of the first reflector reflects the directed beams to one or more satellites.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

Figure 1:
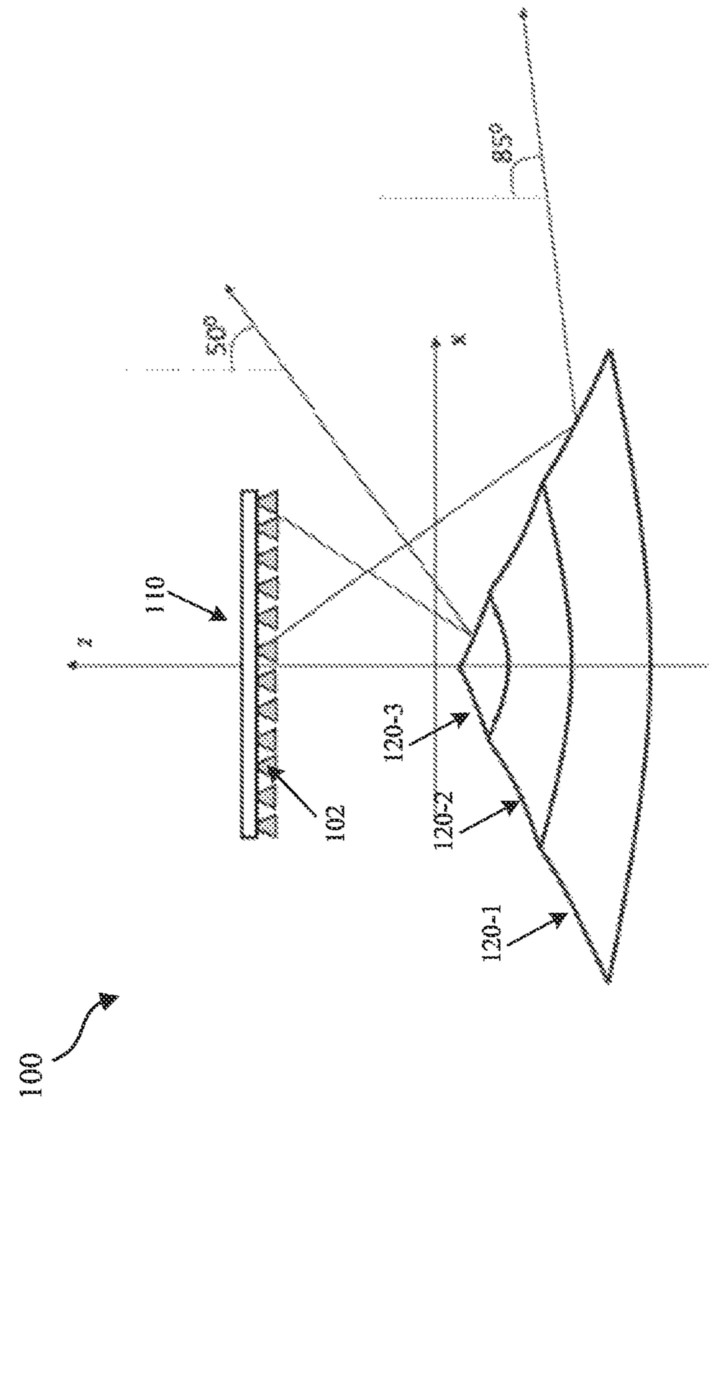
FIG. 1 is a schematic diagram illustrating a cross-sectional view of an example of a multisegment array-fed ring-focus reflector antenna, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

According to various aspects of the subject technology, methods and configurations for providing a multibeam antenna that can be located on a data center and perform the function of multiple reflector antennas are described. The multibeam antenna of the subject technology saves the acreage and backhaul costs associated with multiple reflector antennas. The disclosed solution includes a planar feed array and a contiguous surface of multisegment ring-focus parabolic reflectors. A ring-focus reflector is generated by rotating a two-dimensional mother parabola around a line that is inclined to the primary axis of the mother parabola. The inclined angle of the rotation axis is set such that nominally the surface produces a beam at a chosen elevation angle measured from the axis of rotation. Such a rotated surface will have a ring as its focus instead of a single point (hence the name ring-focus parabola). A combination of multiple ring-focus parabolic-surface segments is capable of producing nominal beams at multiple angles.

In the disclosed solution, three segments are used and the nominal beam-angles are chosen to be 50, 65 and 85 degrees, respectively. This choice is dictated by the elevation scan requirement from about 45 degrees to 85 degrees. The combined surface produces single or multiple beams within 45 degrees to 85 degrees in elevation and for all azimuth angles. The scanning range in elevation can be increased further by adding more ring-focus parabolic segments and with an increased number of array feeds. A single ring-focus reflector may be limited to scanning only a small range of elevation angle (typically 5 to 10 degrees) due to defocusing loss.

The traditional method for solving this problem is to procure and install increasing numbers of dish terminals (e.g., 3.7 m, 5.4 m, 7.2 m) as well as the land required to maintain line-of-sight constraints. This roughly equates to land purchases of one acre of land per additional dish for a 3.7 m dish antenna. Another solution is to use a multibeam electronically scanned array (ESA). This antenna is also known as a direct radiating array (DRA). The DRA is installed in situ at the customer site like the present invention.

The array-fed ring-focus reflector system of the subject technology is better than the conventional gimbaled-reflector solution due to no data backhaul requirement and no increasing land requirement. The disclosed array-fed ring-focus reflector system is installed in situ at the customer site. Therefore, data is taken directly from the terminal and processed at the site. The array-fed ring-focus reflector system of the subject technology also has the advantage that it requires only 60% (or even less for lower scan requirements) of the electronically controlled array elements for its feed as compared to the electronically controlled array elements needed for a DRA with an equivalent gain and scan space.

FIG. 1 is a schematic diagram illustrating a cross-sectional view of an example of a multisegment array-fed ring-focus reflector antenna 100, according to certain aspects of the disclosure. The multisegment array-fed ring-focus reflector antenna 100 (hereinafter, reflector antenna 100) includes an antenna-feed array 110 and a multisegment reflector 120. The feed array 110 includes a number (e.g., about 200 to 250) of subarrays 102, and each subarray 102 includes multiple (e.g., about 220 to 270) antenna-feed elements. The multisegment reflector 120 includes, for example, three segments 120-1, 120-2 and 120-3. Each segment of the multisegment reflector 120 has a parabolic shape and can be made of a number of pieces. This is because the multisegment reflector 120 is quite large with dimensions of a number of meters (e.g., with a diameter of about 15 m and a height of about 9 m. In some implementations, the size of the reflector 120 can be reduced for lower gain requirement.

Example materials that can be used for fabricating pieces of various segments of the multisegment reflector 120 include metals (e.g., aluminum), graphite, fiberglass and other suitable materials. In some aspects, nonmetallic materials such as fiberglass have to be plated with aluminum to provide a suitable reflection coefficient for the radio-frequency (RF) waves.

In some aspects, the reflector antenna 100 can support a large number (e.g., 32) of beams and is capable of providing a gain-to-noise-temperature (G/T), at 5 degrees elevation, of about 25.5 dB/K, an elevation field of view (FOV) within a range of about 5 degrees to 45 degrees and an azimuthal FOV of within a range of about 0 degrees to 360 degrees, and requires about 0.65 acre of land to install. A main advantageous feature of the reflector antenna 100 is the low cost, as it would cost many millions of dollars less than an existing antenna (e.g., a DRA) with similar specifications.

Figure 2:
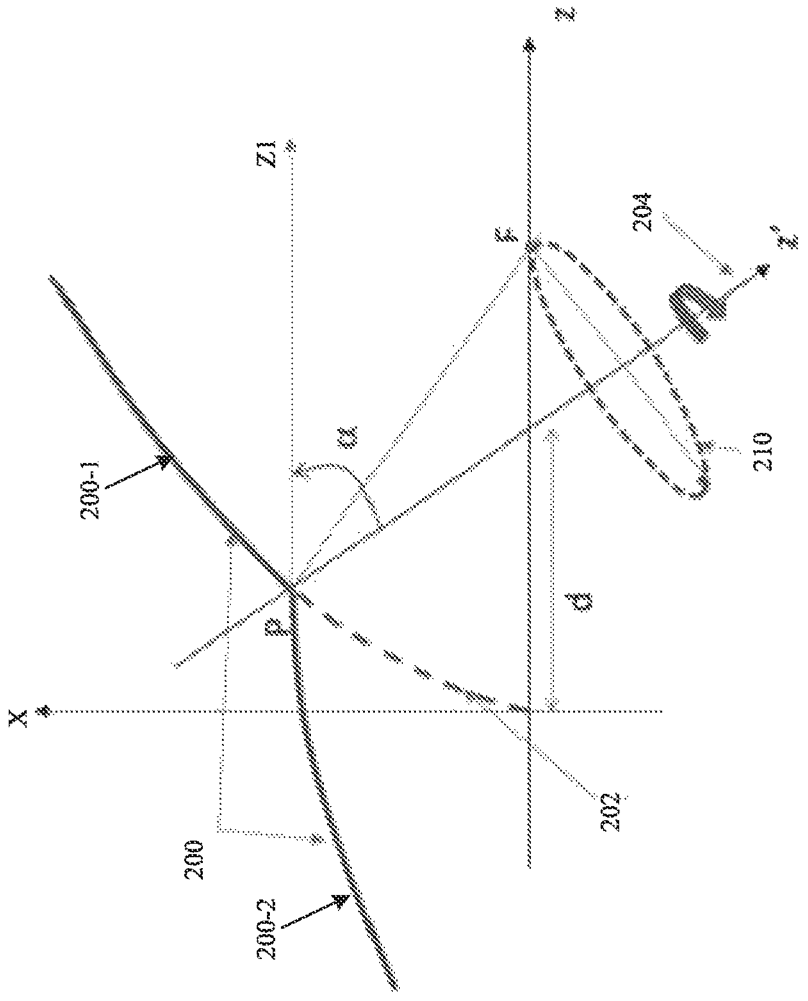
FIG. 2 is a schematic diagram illustrating generation of a ring-focus parabolic surface of an example reflector antenna from a mother parabola, according to certain aspects of the disclosure.

FIG. 2 is a schematic diagram illustrating generation of a ring-focus parabolic surface of an example reflector antenna from a mother parabola 202, according to certain aspects of the disclosure. FIG. 2 shows a cross-sectional view of two ring-focus parabolic surfaces 200 (200-1 and 200-2), each of which can form a segment of the multisegment reflector 120 of FIG. 1, when rotated around a rotation axis 204 (Z'). The three-dimensional (3D) ring-focus parabolic surface of the reflector is generated based on the mother parabola 202 with a focal point F. The locus of the focal point F of the mother parabola 202, when it rotates around the rotation axis 204, is a focal ring 210. The 3-D ring-focus reflector is generated by rotating the two-dimensional mother parabola 202 around the axis 204 that is inclined to the primary axis Z of the mother parabola 202. The inclined angle of the rotation axis 204 is set such that nominally the surface produces a beam at a chosen elevation angle measured from the rotation axis 204. Such a rotated surface will have the focal ring 210 as its focus instead of a single point F (hence the name ring-focus parabola). A combination of multiple ring-focus parabolic-surface segments is capable of producing nominal beams at multiple angles.

The parameters d and «, respectively, represent a distance from axis X and an angle with the axis Z1 (parallel to the axis Z) and are used to define the curvature of the generated ring-focus parabolic surface. The larger the parameter d, and the smaller the angle $\alpha$, """ the smaller the diameter of the focal ring 210. The focal plane of each segment 200 of the multisegment reflector is kept almost identical by adjusting the focal length of the mother parabola 202, the intersection point P of the mother parabola and the rotation axis 204. This allows a planar feed array for exciting the resultant reflector surface. The radial lengths of the segments 200 are adjusted to comply with the required gain variation with the elevation angle.

Figure 3:
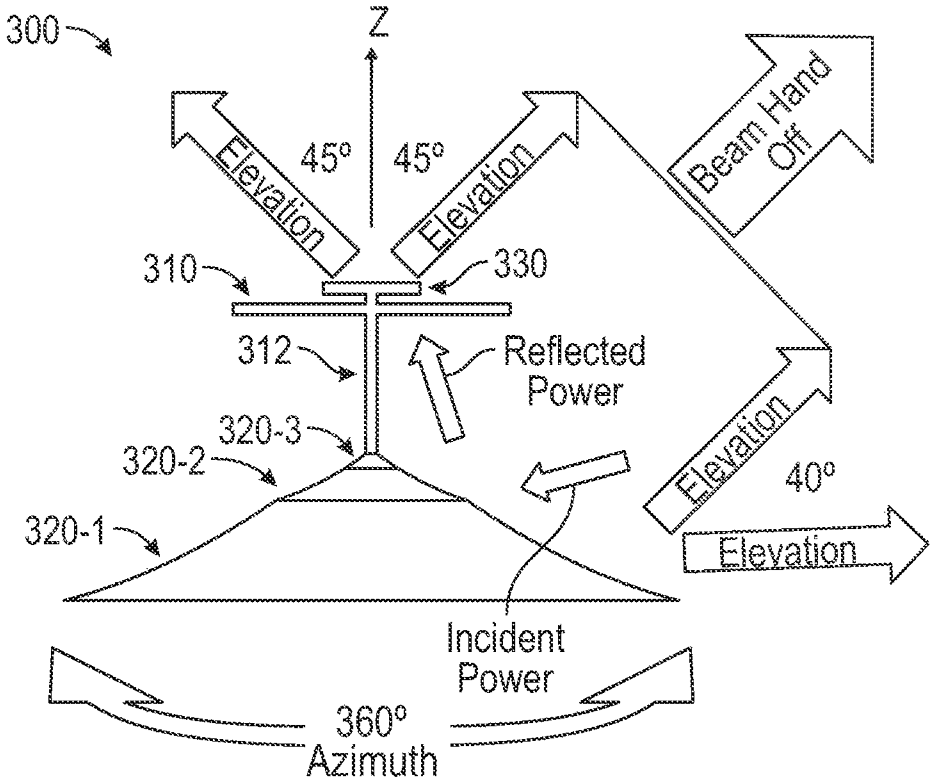
FIG. 3 is a schematic diagram illustrating an example of a multisegment array-fed ring-focus reflector antenna with a direct radiating array (DRA), according to certain aspects of the disclosure.

FIG. 3 is a schematic diagram illustrating an example of a multisegment array-fed ring-focus reflector antenna 300 with a DRA, according to certain aspects of the disclosure. The multisegment array-fed ring-focus reflector antenna 300 (hereinafter, reflector antenna 300) includes an antenna-feed array 310, a multisegment reflector 320 and a top panel 330. The feed array 310 includes a number (e.g., about 200 to 250) of subarrays each including multiple (e.g., about 224 to 270) antenna-feed elements. The multisegment reflector 320 includes a number of segments, for example, three segments 320-1, 320-2 and 320-3. As discussed above with respect to reflector antenna 100 of FIG. 1, each segment of the multisegment reflector 320 has a parabolic shape and can be made of a number of pieces.

The top panel 330 is an ESA that directly radiates in the Z direction and can cover zenith angles (with the Z axis) of about −45 degrees to +45 degrees and hands off to the feed array 310 for beams with elevation angle between 45 degrees and 5 degrees. At these elevation angles, one or more segments of the feed array 310 radiate desired beams to the multisegment reflector 320 for reflection and transmission to the desired low earth orbit (LEO) satellite.

In a receiving scenario, the incident power on the one or more segments of the multisegment reflector 320 from one or more LEO satellites is reflected to the feed array 310. In this scenario, the top panel 330 can directly receive beams within the zenith angles of about −45 degrees to +45 degrees. Both the top panel 330 and the multisegment reflector 320 cover the entire azimuth range of 0 degrees to 360 degrees. In other words, the reflector antenna 300 is a multibeam electronic beam-steering antenna with almost full-hemispheric coverage and can provide reconfigurable connections with a large number (e.g., 32) of users at any time in one ground terminal.

The positions of parabolic segments 320-1, 320-2 and 320-3 are adjusted to avoid step-discontinuities at their interfacing circles. This ensures that the secondary pattern does not have any undesired sidelobes caused by the step-discontinuities. The amplitude and phase of the array-excitation coefficients are optimized to create a spot beam at a given far field location. Note that, for creating a spot beam near the horizon, the feed array 310 needs to radiate at a small angle from array-boresight as one of the reflector segments naturally creates the beam near the horizon with increased gain. Hence, the scan loss of the array is minimal. Consequently, the number of array elements becomes significantly lower than that of a direct radiating array or a conformal array counterpart, causing huge cost savings from an implementation point of view. The antenna structure of the subject technology can be a good alternative for the gateways in other frequency bands, including Ka band.

Example materials that can be used for fabricating pieces of various segments of the multisegment reflector 320 include metals (e.g., aluminum), graphite, fiberglass and other suitable materials. In some aspects, nonmetallic materials such as fiberglass have to be plated with aluminum to provide a suitable reflection coefficient for the RF waves. The reflector antenna 300 reduces the number of elements compared to the existing DRA antenna, which has a faceted array and can cover a limited elevation angle. Further, the fact that the reflector antenna 300 of the subject technology can be installed in one ground terminal drastically simplifies the implementation compared to setting up antenna dishes, which may require an acre of land each. Further, the one-terminal in-situ implementation mitigates data backhaul recurring costs.

Figure 4:
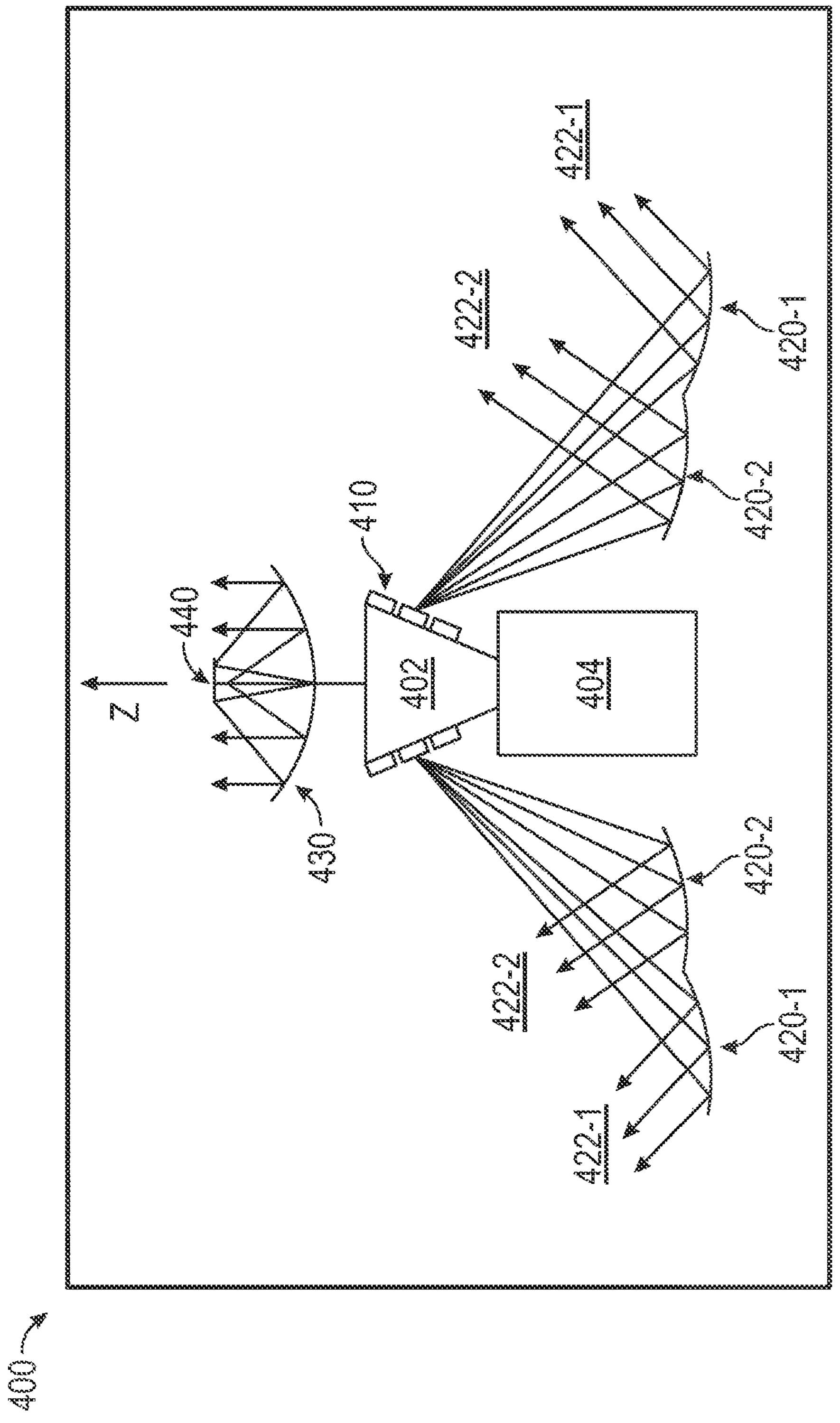
FIG. 4 is a schematic diagram illustrating a cross-sectional view of an example of a multisegment array-fed ring-focus reflector antenna, according to certain aspects of the disclosure.

FIG. 4 is a schematic diagram illustrating a cross-sectional view of an example of a multisegment array-fed ring-focus reflector antenna 400, according to certain aspects of the disclosure. The multisegment array-fed ring-focus reflector antenna 400 (hereinafter, reflector antenna 400) includes an antenna-feed array 410, a multisegment reflector 420, a top reflector 430 and a top panel 440. The feed array 410 is arranged on a conical piece installed on a support structure 404. The feed array 410 includes a number (e.g., about 200 to 250) of subarrays, each including multiple (e.g., about 224 to 270) antenna-feed elements. The feed array 410 is arranged to radiate onto the one or more segments (e.g., 420-1 or 420-2) of the multisegment reflector 420, which reflect the radiation from the feed array 410 into beams 422 (e.g., 422-1 and 422-2). Each beam 422 covers a predetermined range of elevation angles. FIG. 4 shows a cross-sectional view of the reflector antenna 400. Therefore, it should be noted that segments 420-1 and 420-2 form parabolic surfaces that are contiguous and cover the entire set of azimuthal angles between 0 degrees and 360 degrees.

In some aspects, the number of segments of the multisegment reflector 420 can be more than two segments to cover a larger elevation angle. The top panel 440 radiates to the top reflector 430, which is a parabolic reflector, for transmission in the Z direction. In a receive scenario, the top reflector 430 receives LEO beams and concentrates the received beams onto the top panel 440. The feed array 410 and the top panel 440 are ESAs, each including a number (e.g., about 30 to 250) of subarrays including multiple (e.g., about 224 to 270) antenna-feed elements. The reflector antenna 400 can provide multiband operation, reduce the number of feed array elements (compared to the existing DRA) and improve scalability.

Figure 5A:
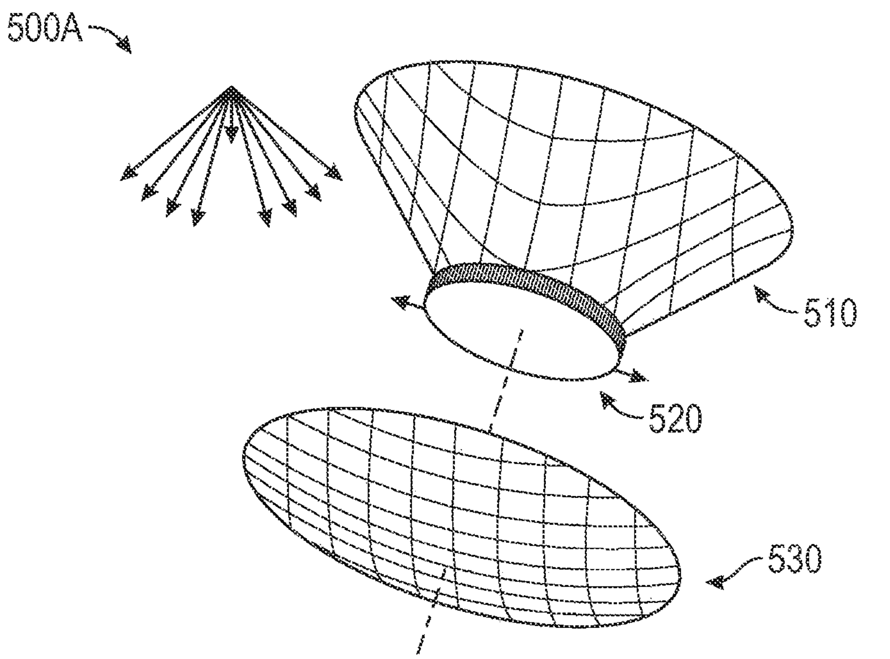
FIGS. 5A and 5B are schematic diagrams illustrating an example of a dual-reflector multisegment array-fed ring-focus reflector antenna and a corresponding cross-sectional view, according to certain aspects of the disclosure.
Figure 5B:
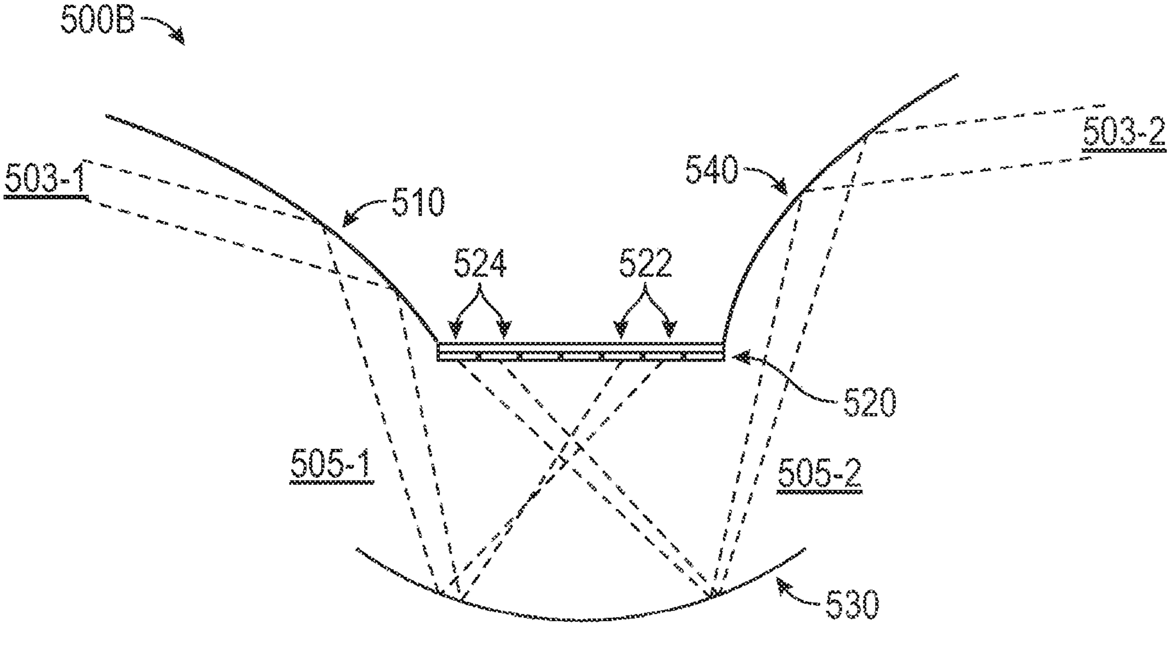

FIGS. 5A and 5B are schematic diagrams illustrating an example of a dual-reflector multisegment array-fed ring-focus reflector antenna 500A and a corresponding cross-sectional view 500B, according to certain aspects of the disclosure. The dual-reflector multisegment array-fed ring-focus reflector antenna 500A (hereinafter, dual-reflector antenna 500A) includes a first reflector (main reflector) 510, a feed array 520 and a second reflector (sub-reflector) 530.

The first reflector 510 is a conical reflector and has a reflecting concave surface. The feed array 520 is an ESA-feed panel that is coupled to a base of the first reflector 510. The second reflector 530 is a parabolic reflector facing the feed array 520 and at a distance from the feed array 520.

FIG. 5B shows the cross-sectional view 500B of the dual-reflector antenna 500A. The first reflector 510 reflects the satellites, beams 503 (503-1 and 503-2) onto the second reflector 530, which in turn directs the reflected beams 505 (505-1 and 505-2) to subarrays 522 and 524 of the feed array 520, respectively. In a transmit scenario (not shown for simplicity), the second reflector 530 directs beams radiated by the subarrays of the feed array 520 to the reflecting concave surface of the first reflector 510. The first reflector 510 reflects the directed beams to one or more satellites (e.g., LEO satellites). In one or more aspects, the first reflector 510 can be implemented as a multisegment (e.g., three-segment) array-fed ring-focus reflector (e.g., 320 of FIG. 3) to provide multiband operation, further reduce the number of feed array elements (compared to the existing DRA) and improve scalability.

Figure 6:
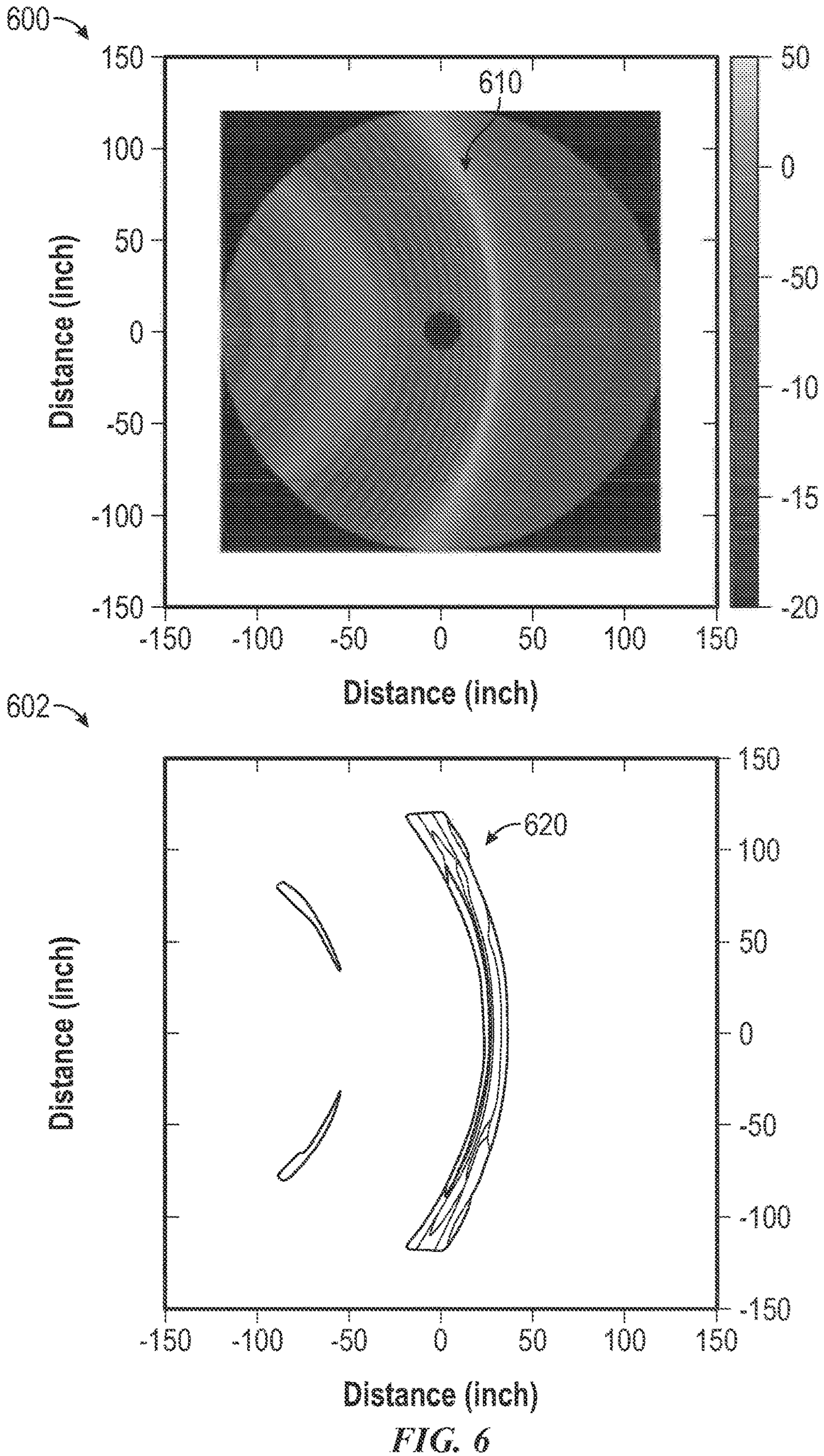
FIG. 6 illustrates plots depicting excitation power distribution for a multisegment array-fed ring-focus reflector antenna and an 85-degree scan, according to certain aspects of the disclosure.

FIG. 6 illustrates charts depicting excitation power distribution plots 600 and 602 for a multisegment array-fed ring-focus reflector antenna and an 85-degree scan, according to certain aspects of the disclosure. The excitation power distribution plot 600 shows the power level in dB across a feed array (e.g., 310 of FIG. 3) with about 55,440 elements for the 85-degree scan. The bright curve 610 depicts a region with maximum relative power level (e.g., 50 dBr). The excitation power distribution plot 602 shows a contour 620 depicting power distribution within a range of −15 dBr to 10 dBr in an area of the feed array covered by the contour 620 for the 85-degree scan. Note that only a small fraction of the total number of elements in the feed array are used to form a beam.

Figure 7B:
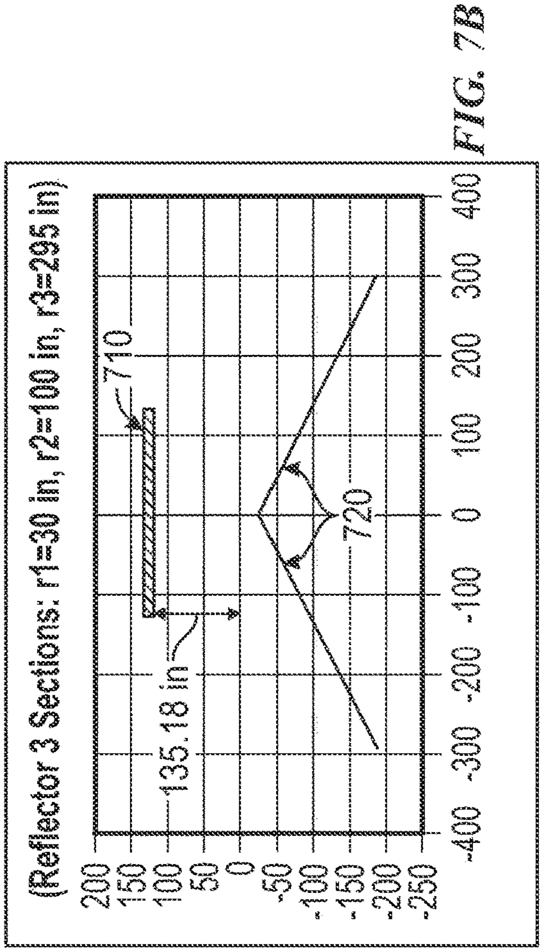
FIGS. 7A, 7B and 7C are diagrams illustrating a feed array along with a corresponding position chart and a gain chart, according to certain aspects of the disclosure.
Figure 7C:
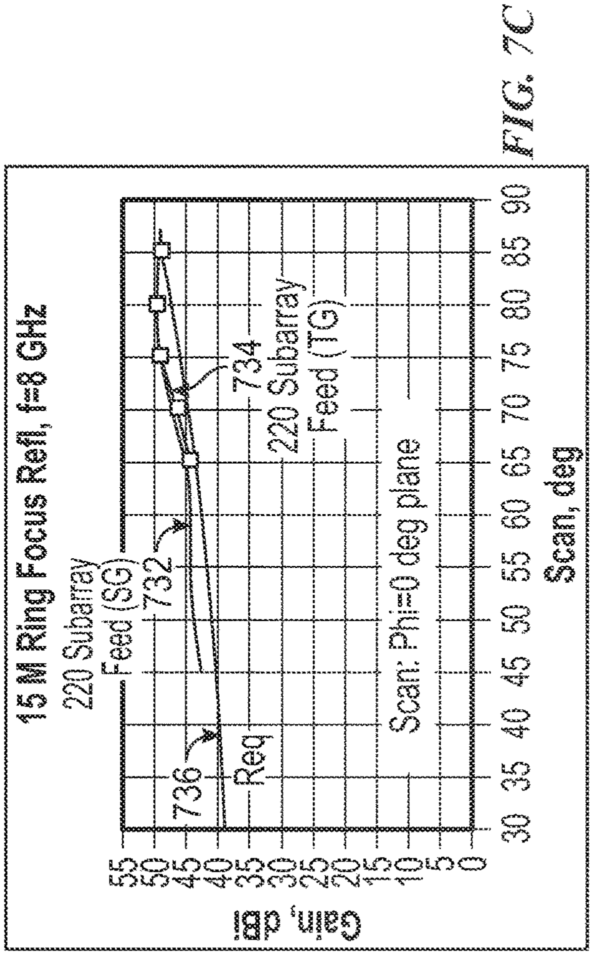
Figure 7A:
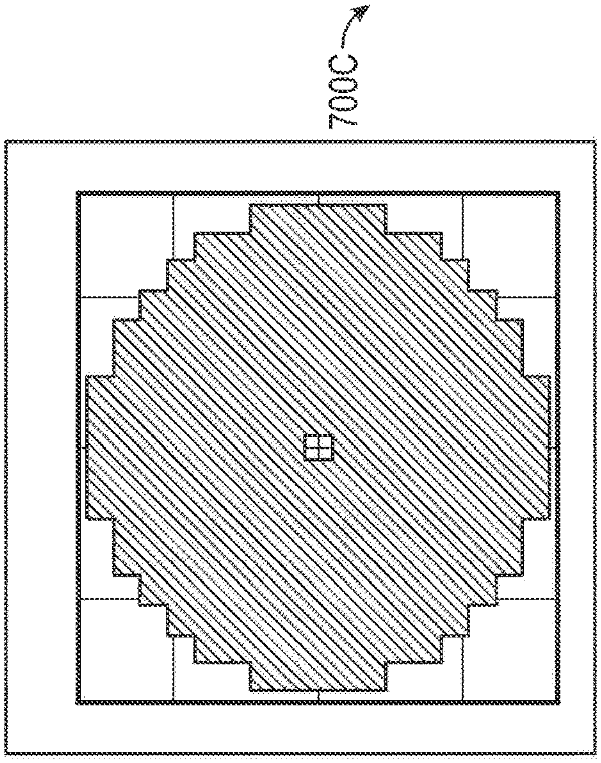

FIGS. 7A, 7B and 7C are diagrams illustrating a feed array 700A along with a corresponding position chart 700B and a gain chart 700C, according to certain aspects of the disclosure. The feed array 700A shown in FIG. 7A has a square grid of radiating elements of about 0.9 inches×0.9 inches including 220 subarrays.

The position chart 700B shown in FIG. 7B depicts a line 710 that depicts a position of the feed array, and the curve 720 depicts a position of a three-segment reflector. The distances shown in the chart are in inches. The multisegment reflector (e.g., 320 of FIG. 3) has three segments. The first segment (e.g., 320-1 of FIG. 3) has a radius larger than 100 inches and covers an elevation angle (a) of about 85 degrees. The second segment (e.g., 320-2 of FIG. 3) has a radius within a range of about 30 inches to 100 inches and covers an elevation angle (a) of about 65 degrees. The third segment (e.g., 320-3 of FIG. 3) has a radius smaller than 30 inches and covers an elevation angle (a) of about 50 degrees.

The gain chart 700C shown in FIG. 7C includes plots 732, 734 and 736 for a ring-focus reflector at a frequency of 8 GHz. The plot 732 is a gain (dBi) versus scan angle (degrees) for a feed array with square grid described above. The plot 734 is gain (dBi) versus scan angle (degrees) for a feed array with triangular grid of about 0.92 inches×0.8 inches including 220 subarrays. The plot 736 is the required gain (dBi) versus scan angle (degrees), according to a specification. The gains shown in plots 732 and 734 are seen to increase with reduced elevation angle to compensate slant range variation.

In some aspects, the subject technology is related to methods and configurations for providing a multisegment array-fed ring-focus reflector antenna for wide-angle scanning. In other aspects, the subject technology may be used in various markets, including, for example and without limitation, communication systems markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patents or other documents that may be incorporated herein by reference, the definition that is consistent with this specification should be adopted.

What is claimed is:

1. A dual-reflector multisegment antenna, comprising:
- a first reflector comprising a concave surface;
- an electronically scanned array (ESA) feed array coupled to a base of the first reflector; and
- a second reflector facing the ESA feed array, wherein:
  - the concave surface is configured to reflect a plurality of beams to the second reflector, and
  - the second reflector is configured to direct the plurality of beams radiated to the ESA-feed array.

2. The dual-reflector multisegment antenna of claim 1, wherein the first reflector comprises a multisegment ring-focus reflector configured to reflect the plurality of beams to the second reflector.

3. The dual-reflector multisegment antenna of claim 1, wherein:
- the ESA feed array comprises subarrays, and
- the second reflector is configured to direct at least some of the plurality of beams to the subarrays.

4. The dual-reflector multisegment antenna of claim 3, wherein:
- the subarrays comprises antennas, and
- the second reflector is configured to direct at least some of the plurality of beams from the antennas to the first reflector.

5. The dual-reflector multisegment antenna of claim 4, wherein the first reflector is configured to direct at least some of the plurality of beams from the second reflector, via the antennas, to one or more satellites.

6. The dual-reflector multisegment antenna of claim 1, wherein the second reflector comprises a parabolic reflector.

7. The dual-reflector multisegment antenna of claim 1, wherein the first reflector comprises a conical reflector.

8. A dual-reflector multisegment antenna, comprising:
- a conical reflector comprising a base, the conical reflector further comprising a first concave surface;
- a feed array coupled to the conical reflector at the base; and
- a parabolic reflector comprising a second concave surface that faces the feed array,
- wherein in response to a beam incident on the conical reflector:
  - the conical reflector is configured to direct, based on the first concave surface, the beam to the second concave surface, and
  - the second concave surface is configured to direct the beam to the feed array.

9. The dual-reflector multisegment antenna of claim 8, wherein:
- the feed array comprises a first subarray and a second subarray, and
- in response to the beam incident on the parabolic reflector, the parabolic reflector is configured to direct, based on the second concave surface, the beam to the first subarray or the second subarray.

10. The dual-reflector multisegment antenna of claim 9, wherein:
- each of the first subarray and the second subarray comprises antennas, and
- the parabolic reflector is configured to direct the beam to at least one of the antennas.

11. The dual-reflector multisegment antenna of claim 8, wherein the base comprises a circular base.

12. The dual-reflector multisegment antenna of claim 8, wherein the feed array comprises an electronically scanned array (ESA) feed array.

13. The dual-reflector multisegment antenna of claim 8, wherein the conical reflector further comprises a cone-shaped reflector.

14. The dual-reflector multisegment antenna of claim 13, wherein the cone-shaped reflector defines the first concave surface.

15. A method for directing one or more beams, the method comprising:
- providing a conical reflector comprising a first concave surface;
- providing a parabolic reflector comprising a second concave surface, wherein the parabolic reflector is configured to receive the one or more beams from the conical reflector based on the first concave surface; and
- providing a feed array coupled to the conical reflector, wherein the feed array is configured to receive the one or more beams from the parabolic reflector based on the second concave surface.

16. The method of claim 15, wherein:
- the feed array comprises a subarray, and
- the subarray is configured to receive the one or more beams from the parabolic reflector.

17. The method of claim 15, wherein providing the conical reflector providing a cone-shaped reflector.

18. The method of claim 15, wherein providing the conical reflector comprising providing a cone-shaped reflector that defines the first concave surface.

19. The method of claim 18, wherein the parabolic reflector is configured to receive the one or more beams from the first concave surface.

20. The method of claim 15, wherein providing the feed array comprises providing a plurality of antennas.

* * * * *